(12) United States Patent
Bist et al.

(10) Patent No.: US 9,202,251 B2
(45) Date of Patent: *Dec. 1, 2015

(54) SYSTEM AND METHOD FOR GRANULAR TAGGING AND SEARCHING MULTIMEDIA CONTENT BASED ON USER REACTION

(76) Inventors: Anurag Bist, Newport Beach, CA (US); Hamid Lalani, Dove Canyon, CA (US)

(*) Notice: Subject to any disclaimer, the term of this patent is extended or adjusted under 35 U.S.C. 154(b) by 285 days.

This patent is subject to a terminal disclaimer.

(21) Appl. No.: 13/291,064

(22) Filed: Nov. 7, 2011

(65) Prior Publication Data

US 2013/0117375 A1     May 9, 2013

(51) Int. Cl.
*G06F 15/16* (2006.01)
*G06Q 50/00* (2012.01)
*G06F 17/30* (2006.01)
*G06Q 30/02* (2012.01)

(52) U.S. Cl.
CPC .......... *G06Q 50/01* (2013.01); *G06F 17/30032* (2013.01); *G06Q 30/02* (2013.01)

(58) Field of Classification Search
CPC ........................................................ G06F 15/16
USPC ................................................ 725/10, 11, 12
See application file for complete search history.

(56) References Cited

U.S. PATENT DOCUMENTS

| | | | |
|---|---|---|---|
| 2002/0174425 A1* | 11/2002 | Markel et al. | 725/13 |
| 2003/0154180 A1 | 8/2003 | Case | |
| 2006/0085419 A1 | 4/2006 | Rosen | |
| 2008/0097822 A1 | 4/2008 | Schigel | |
| 2008/0133716 A1 | 6/2008 | Rao | |
| 2009/0012925 A1 | 1/2009 | Brown | |
| 2010/0049534 A1 | 2/2010 | Whitnah | |
| 2010/0082751 A1* | 4/2010 | Meijer et al. | 709/206 |
| 2010/0107075 A1 | 4/2010 | Hawthorne | |
| 2010/0138491 A1 | 6/2010 | Churchill | |
| 2010/0144440 A1 | 6/2010 | Arrasvuori | |
| 2010/0153983 A1* | 6/2010 | Philmon et al. | 725/13 |
| 2011/0225043 A1 | 9/2011 | Bhatia | |
| 2011/0264531 A1 | 10/2011 | Bhatia | |
| 2011/0321175 A1 | 12/2011 | Slater | |
| 2012/0222057 A1* | 8/2012 | Sadowsky et al. | 725/10 |
| 2012/0222058 A1* | 8/2012 | el Kaliouby et al. | 725/10 |
| 2012/0265811 A1 | 10/2012 | Bist | |
| 2012/0290508 A1 | 11/2012 | Bist | |
| 2013/0014141 A1* | 1/2013 | Bhatia et al. | 725/10 |
| 2013/0288212 A1 | 10/2013 | Bist | |

* cited by examiner

*Primary Examiner* — Jerry Dennison
(74) *Attorney, Agent, or Firm* — Henry J. Cittone; Citonne & Chinta LLP

(57) ABSTRACT

A system and a method for generating an emotional profile of the user and deriving inference from the analytics of generated emotional profile is provided. The method involves sharing media content or online event in a connected environment; capturing user's reaction to the said content or event; generating an emotional score of the user to rate the media content or event; and sharing the emotional score within the connected environment.

17 Claims, 4 Drawing Sheets

US 9,202,251 B2

SYSTEM AND METHOD FOR GRANULAR TAGGING AND SEARCHING MULTIMEDIA CONTENT BASED ON USER REACTION

FIELD OF THE INVENTION

The present invention relates generally to a method for granular tagging of multimedia content in a connected network, and more particularly, to a system that has an ability to add meaningful contextual and personalized information to the content in a granular fashion.

BACKGROUND OF THE INVENTION

With the growth of connected infrastructure, social networking has become more ubiquitous in everyday lives. A large part of our lives is being dictated by online or otherwise accessible content, and how this content is influenced by the tools and the network that connect us. Recent examples include the changes in platforms like Facebook where they are using services like Spotify to deliver content to match people's preferences, partnership of Netflix with Facebook to make their content repository more 'social', Hulu's existing social media tools, and other similar services.

While the above attempts are steps towards making content more relevant for classification, these still don't address a few fundamental issues: (a) how to pin-point specific areas in a content (video or audio) file that could highlight the usefulness of the content in a particular context, (b) some indication of the "True" reactions of individuals, groups of individuals, or a large demography of people to a particular content, or a specific area of the content, (c) a method, or platform to make such granular tagging, rating, and search of content happen in a generic and scalable way.

In light of above, a method and a system for a scalable platform is provided that enables granular tagging of any multimedia or other web content over connected networks. The method of the invention provides an ability to go in much more granular within a content and enable a way to add meaningful contextual and personalized information to it, that could then be used in searching, classifying, or analyzing the particular content in a variety of ways, and in a variety of applications.

OBJECTS OF THE INVENTION

It is a primary object of the invention to provide a system for tagging the content based on the individual and personal cues of the users. One example of these cues is emotional profile or emotional score of the users.

It is a further object of the invention to provide a method for tagging a multimedia content in granular manner.

It is still a further object of the invention to provide a system that provides a uniform way of continuous and granular tagging of the multimedia content via individual cues, emotional profiles, or emotional scores.

A further and related object of the invention is to provide a method of tagging the content with an instantaneous Emotional Score, an instantaneous Emotional Profile, or an individual cues score based on a specific user's reaction and at a specific time stamp of the content.

BRIEF SUMMARY OF THE INVENTION

Accordingly in an aspect of the present invention, a system for tagging multimedia content based on individual cues, emotional score or emotional profile is provided. The system comprises of a network of client devices having access to shared multimedia content in a cloud network. The client device has a module to continuously record the individual cues, emotional score or reaction of the user while viewing the content. The central database stores individual score related to individual cues, emotional score or profile of the entire user as a result of watching the content and in this manner tag the content.

In another aspect of present invention, a method for granular individual cues tagging or emotional tagging of multimedia content is provided. The method comprises of capturing a user's instantaneous reaction to the content by Emotion detection or individual cues detection module; generating an instantaneous emotional score or individual cues score with function of time; tagging the content with an instantaneous Emotional Score or individual cues score based on a specific user's reaction and at a specific time stamp of the content; characterize the content in a very granular manner; and sharing the granular tagging characteristics of the content in the network.

BRIEF DESCRIPTION OF THE DRAWINGS

The invention will hereinafter be described in conjunction with the figures provided herein to further illustrate various non-limiting embodiments of the invention, wherein like designations denote like elements, and in which.

DETAILED DESCRIPTION OF INVENTION

In the following detailed description of embodiments of the invention, numerous specific details are set forth in order to provide a thorough understanding of the embodiments of invention. However, it will be obvious to a person skilled in art that the embodiments of invention may be practiced with or without these specific details. In other instances well known methods, procedures and components have not been described in details so as not to unnecessarily obscure aspects of the embodiments of the invention.

Furthermore, it will be clear that the invention is not limited to these embodiments only. Numerous modifications, changes, variations, substitutions and equivalents will be apparent to those skilled in the art, without parting from the spirit and scope of the invention.

Nowadays with the increase in use of social networking and multimedia content repository, the content is rated based on the individuals liking and disliking of the content. Typically most rating and tagging of content are limited to the option whereby user manually enters the feedback either in form of "like" or in "dislike". The present invention provides a system and method that includes individual's cues, emotional scores or profiles to tag a multimedia content in a granular manner. The system combines individual cues score, emotional profile or emotional score of the user in a social networking set up to make a more powerful impact on the user's consumption habit. The present invention further extends the concept of individual cues score, Emotional Score or Emotional Profile tagging of content to a more granular level within a specific content and provides a method and a system to achieve this process in a uniform way, including ways to use such tagging for various methods of analytics and monetization models. The inclusion of individual cues scores, Emotional Scores or Emotional Profiles adds a very unique behavioral aspect to content that may then be used for searching, analytics and various kinds of monetization models for the particular content. The individual cue scores, Emotional Score or Profile is a combination of the emotion, behavior, response, attention span, gestures, hand and head movement, or other reactions or stimuli of the user collected through the sensors available in the client devices and then processed.

Figure 1:
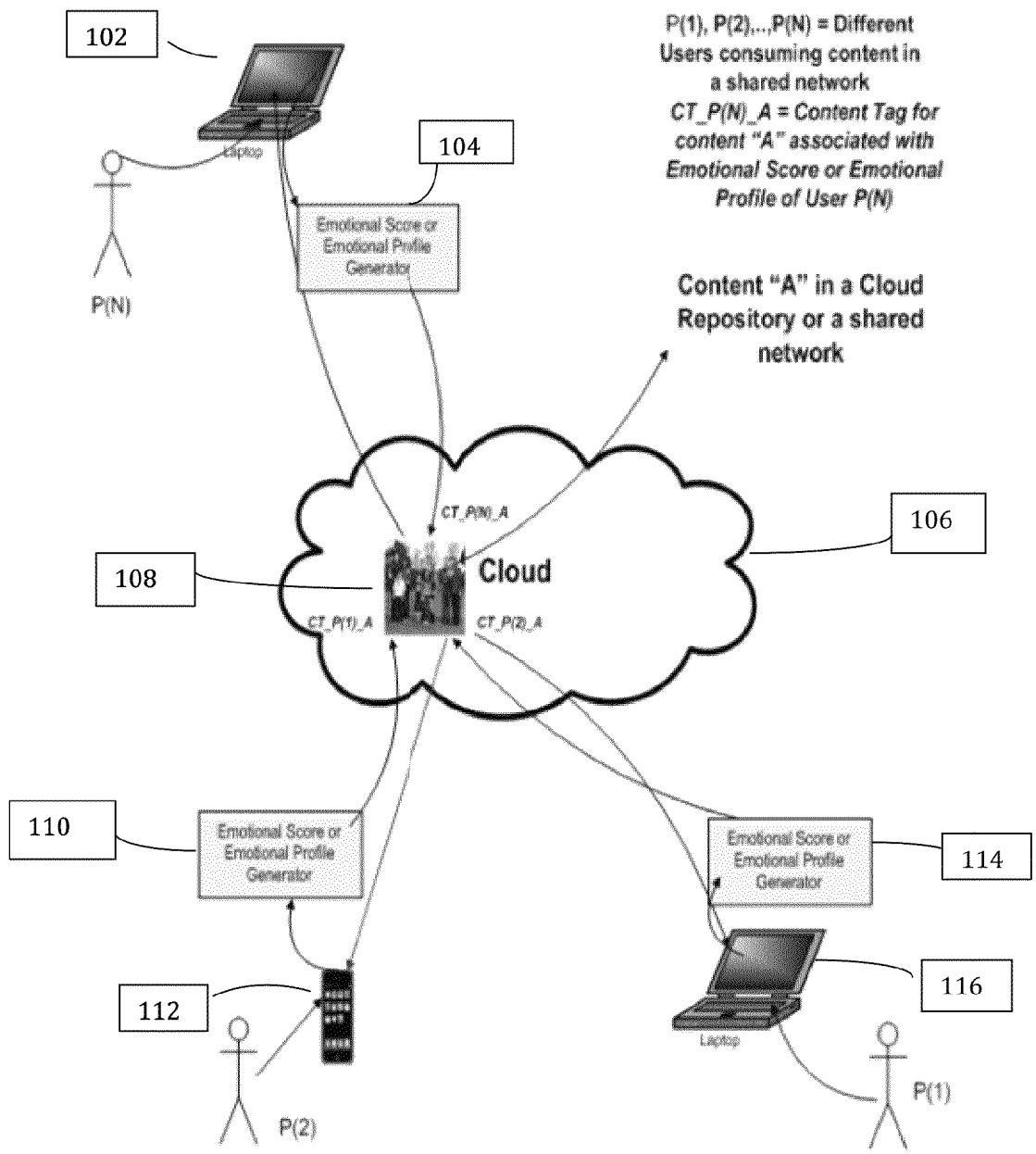
FIG. 1 illustrates a schematic representation of an embodiment of an interacting system for Emotional score or emotional profile based content tagging in connected network in accordance with an embodiment of the present invention.

FIG. 1 illustrates a schematic representation of interacting system for individual cues score, Emotional Score or Emotional Profile based content tagging in connected network in accordance with an embodiment of the present invention. The system comprises of a plurality of (P(1), P(2), . . . , P(N)) connected to each other in a network through their respective client devices: client device 1 116, client device 2 112, and client device N 102. The client devices 102, 112 and 116 are configured with a server in the cloud network 106 that is having a multimedia repository containing content 108 that are accessible by the client devices of the users. The content A 108 is accessible by the different users in the network through their respective client devices 102, 112 and 116. The client devices 102, 112 and 116 have a module that has an inherent ability to continuously capture some critical auditory, visual, or sensory inputs from the individuals. This module is a functionality that may be a combination of the available sensors in the client device (camera/webcam, microphone, other sensors like tactile/haptic etc.) and the available processing modules present in the client devices. The client devices 102, 112 and 116 capture these inputs as they change in response to the individual's reaction to viewing of content A 108 that is part of connected media repository in cloud network 106. The individual cues score, emotional score or emotional profile generator 104 of client device N 102 generates the individual reaction, individual cues score, or emotional score of the user as a result of watching the content. The individual cues score, emotional score or the emotional profile of the user N associated with the content is then used to tag the content A 108 in form of CT_PN_A. Similarly the individual cues score, emotional score or reaction of the user 1 and user 2 is also generated by their respective individual cues score generator or emotional profile generator 114 and 110, and their scores are tagged to the content in form of CT_P1_A and CT_P2_A. As a result of this the content A 108 that has been watched by n number of users, and the individual reaction, individual cues score, or the emotional score (CT_P(1)_A), CT_P(2)_A, . . . , CT_P(3)_A) of each user as a result of watching the content is tagged to the content A 108. The individual cues score or the emotional score tagged to the content is then stored in the cloud network as an update on the individual cues profile or the Emotional Profiles of the users P(1), P(2), . . . P(N). Alternatively, the client devices need not generate and send individual reaction, individual cues score, or the emotional score to the cloud or server, and may instead transmit data (e.g. auditory, visual, or sensory inputs from the individuals) to one or more servers which process said data to create the individual cues score or the emotional score and update the individual cues profile.

In an embodiment of the present invention, the content A 108 tagged by the individual cues scores, Emotional Scores, or Emotional Profiles of a number of users may be used in multiple ways to increase the relevance of the content on an application specific, user specific, or delivery specific contexts.

In an embodiment of the present invention the client device 102 comprises of a single module or a plurality of modules to capture the input data from the individual, to process the input data for feature extraction and a decision phase for generating the profile of the user. Some examples of these input modules may be webcams, voice recorders, tactile sensors, haptic sensors, and any other kind of sensory modules.

In another embodiment of the present invention, the client devices 102, 112 and 116 include but is not limited to being a mobile phone, a Smartphone, a laptop, a camera with WiFi connectivity, a desktop, tablets (iPAD or iPAD like devices), connected desktops or other sensory devices with connectivity.

In another embodiment of the present invention, the individual cues score, emotional profile or emotional score corresponds to the emotion, behavior, response, attention span, gestures, hand and head movement, or other reactions or stimuli of the user.

Figure 2:
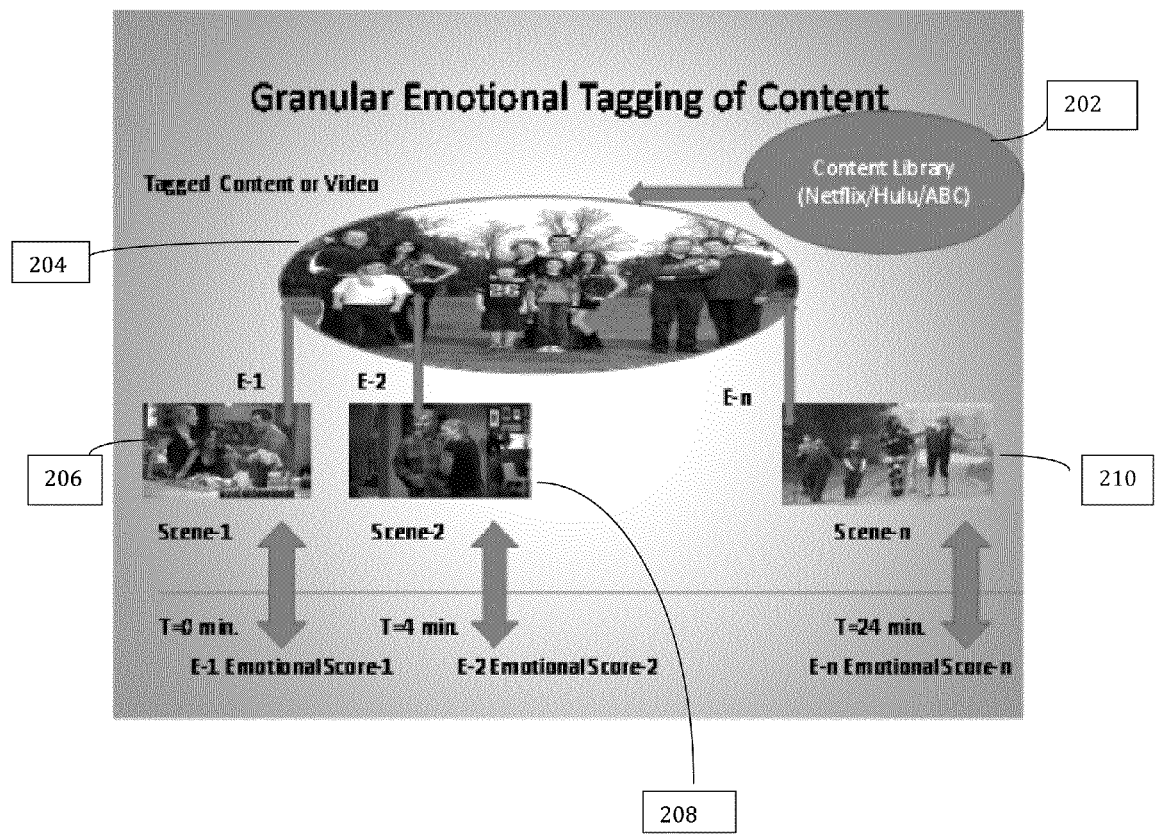
FIG. 2 shows an exemplary illustration of granular tagging of multimedia content in accordance with an embodiment of the present invention.

FIG. 2 shows an exemplary illustration of granular tagging of multimedia content in accordance with an embodiment of the present invention. The example illustrates a method that enables more granular tagging of a multimedia content by the different users. The example shows an episode of a TV show 204 that is 24 minute long that has to be tagged with the emotional score in a granular manner. The episode of TV show 204 is a part of content library 202 or connected repository. The users connected in the network has an access to the content library 202 through their respective client devices, and the content library 202 consist of various channel such as Netflix/Hulu/ABC that provides a link to various multimedia content available online. When the user watches this multimedia content, the system tags the content by his reaction or emotional score at regular intervals. The example shows a TV show 204 that has to be tagged based on emotional score in a granular manner. While the TV show 204 is being watched by the user, the content is being tagged with the emotional score of the user watching the TV show 204 in continuous manner. The TV show 204 is divided into number of time segments, for instance scene 1 206 is for time t=0. The emotional score of the user associated with scene 1 is E1. Similarly scene 2 208 is for time interval t=4 min and the emotional score associated with that particular time is E2. Thus the tagging of the TV show 204 results in a number of tags that are associated with the exact time stamp of a particular segment. At the end of the tagging the TV show 204 now has several reactions or Emotional Score tags that are associated with specific time segments of the show.

In an embodiment of the present invention, the content 204 to be emotionally tagged is divided into a number of time segments, the segments being equally spaced. When the content 204 is tagged by the emotional score of a large number of users, the average emotional score for a particular time segment of the content 204 may be created. This in turn provides a unique way to classify different part of a TV show with very useful information about the user's reactions or Emotional Score tagged with respect to time segment of the TV show. In another embodiment of the present invention the tags may be individual cues of specific users that may include attention span, gestures, head and hand movements and other sensory inputs given by the users while watching a specific content.

Figure 3:
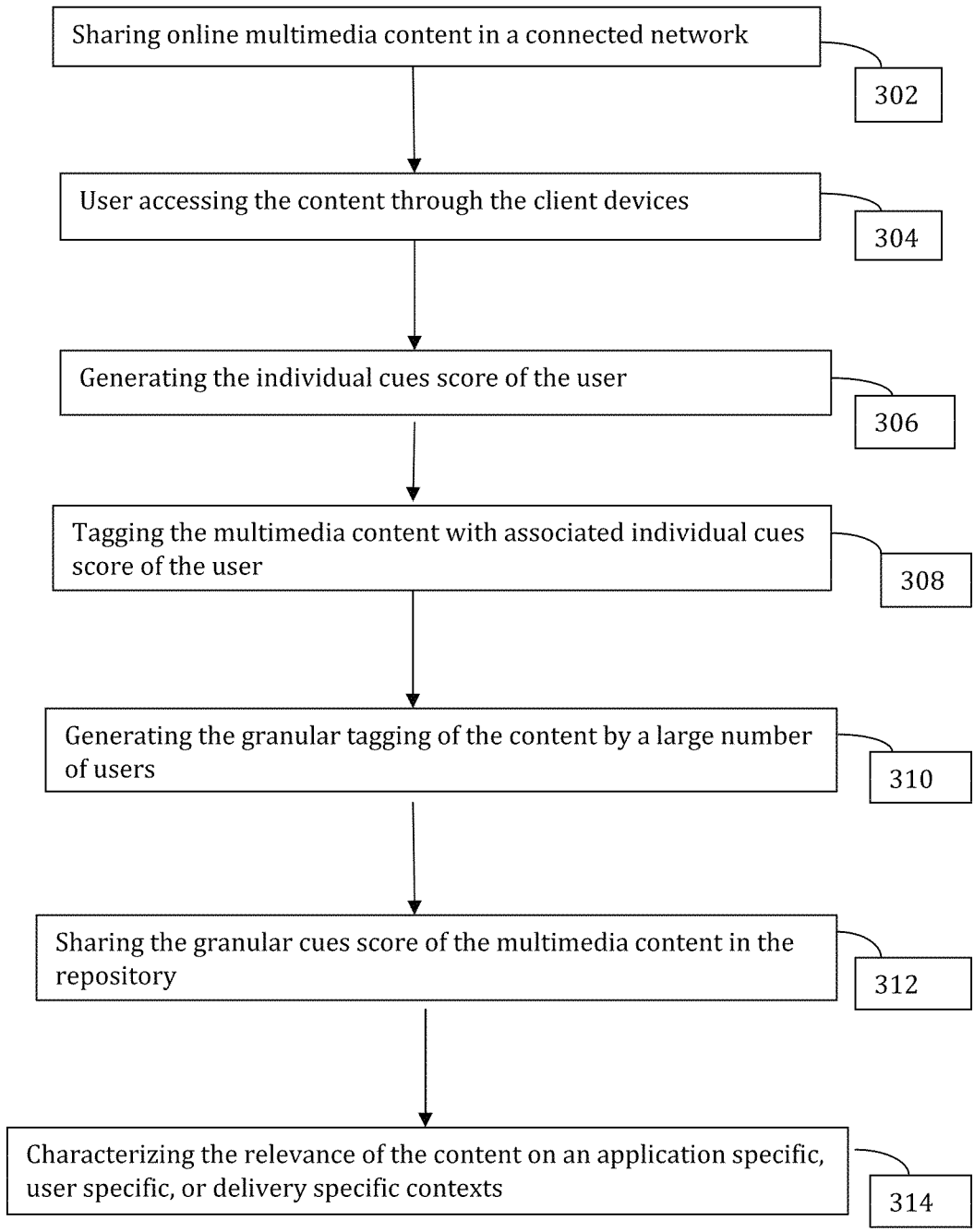
FIG. 3 illustrates a flow diagram depicting the method for tagging the content in a granular manner in accordance with an embodiment of the present invention.

FIG. 3 illustrates a flow diagram depicting the method for tagging the content in a granular manner in accordance with an embodiment of the present invention. In an embodiment the method Include following steps: Step 302: The online media content is stored in multimedia repository which is connected to the server in the cloud network. The multimedia repository being configured to the server has an ability to share the content in the networked environment. Step 304: The plurality of users are connected in the network with each other and to the multimedia repository, and thus have an access to the content in the repository. Step 306: When the user accesses the media content, the user express their feelings in form of individual cues or emotions. These individual cues or emotions are captured by the module present in client devices that generates the individual cues score, emotional score or emotional profile of the user associated with the content being viewed by the user. Step 308: the generated individual cues score, emotional score or emotional profile of the user is tagged to the content. The individual cues score, emotional profile or emotional scores are generated in continuous manner, and for a particular segment of the content, the score corresponding to that segment is tagged. This results in granular individual cues or emotion based tagging of the video content. Step 310: The granular tagging of the content is done by specifically tagging the individual cues score or emotional score of the user with respect to the content being watched. Thus the content is tagged with the individual cues score or emotional score of a large number of users. Step 312: After generating the individual cues score or emotional score of the user associated with the media content, the granular Individual cues or emotional tagging of the content is shared in the central repository. Thus the content is having a tag from a large number of users who have watched the content. Step 314: The granular individual cues score or emotional score of the content is then used to characterize the media content.

In an embodiment of the present invention, the tagged information may be used in multiple ways to increase the relevance of the content on an application specific, user specific, or delivery specific contexts.

Figure 4:
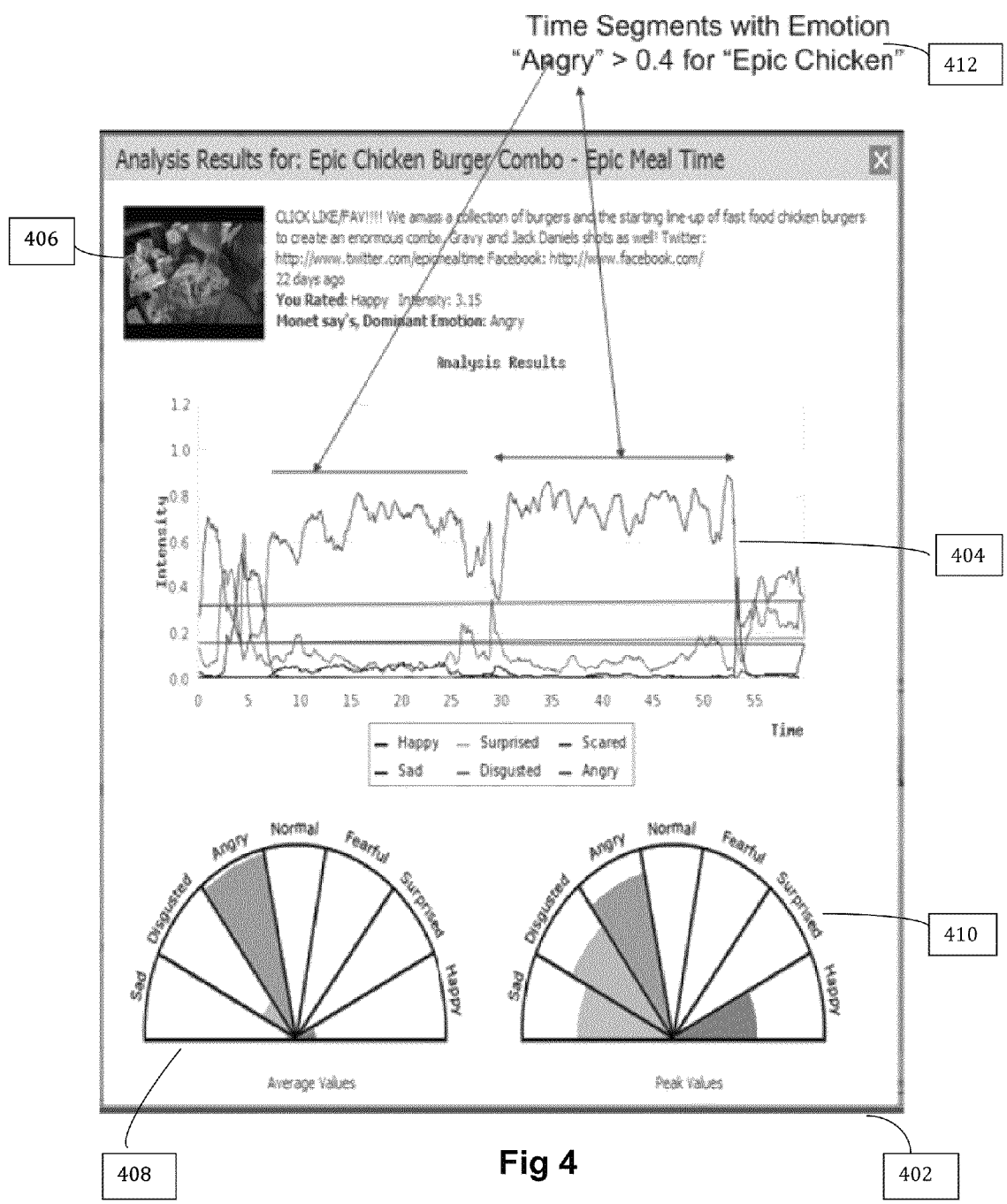
FIG. 4 illustrates a user interface showing the concept of granular emotion based tagging of multimedia content in accordance with an embodiment of the present invention.

FIG. 4 illustrates a user interface showing the concept of granular individual cues or emotion based tagging of multimedia content in accordance with an embodiment of the present invention.

The interface 402 shows an output of the module that detects instantaneous reaction, individual cues score, or Emotional Score in a system of the invention. The interface 402 comprises of various regions that shows the outcome of the granular individual cues or emotional tagging of the multimedia content. The region 406 provides the details of video content that has been viewed by the user and is tagged thereafter. The region 406 provides the content details along with metadata that links the content to its source, and the rating given by the user with its intensity and the rating detected by the system through its module. The interface 402 shows the output to the Emotional Score generator module for a specific content ("Epic Chicken Burger Combo" (a YouTube video)). The user's reaction on watching this video is generated by the Emotion Detection module 104. The reaction may be based on a variety of sensors (webcam, voice recording, tactile or haptic sensors, or other sensory modules). The instantaneous Emotional Score of the user is generated as a function of time as shown in region 404. The time axis is synchronized with the time stamps of the content ("Epic Chicken Burger Combo"). The instantaneous score is the normalized Emotion displayed by the user and may have a number of different emotions at any given instance. The graph in the region 404 provides the users emotional score while viewing the content in a continuous granular manner with respect to different time segments. The interface 402 further comprises of region 408 that provides a D-graph displaying the average value of the emotional score of content 406 and a region 410 that displays a D-graph showing the peak values for the emotional score that has been generated while the user had watched the content 406.

In an embodiment of the present invention the intensity of the detected emotions vary from the range of 0 to 1 and the different types of emotions used to predict the behavior of the user may be one of 7. The detected emotional state includes Happy, Surprised, Fearful, Normal, Angry, Disgusted, and Sad.

In another embodiment or application, the different emotions may be a smaller subset and may have scores in a different scale. This provides a method of tagging the content with an instantaneous Emotional Score based on a specific user's reaction and at a specific time stamp of the content. Thus, a uniform way of continuous and granular Emotional tagging of any content may be done. In another embodiment of the present invention the tags may be individual cues scores instead of Emotional Scores. These individual cues may include attention span, gestures, head and hand movements and other sensory inputs given by the users while watching a specific content In another embodiment of the present invention, the granular tagging of a variety of content may be done by a large number of users. The granular emotional tagging may then be used to provide a characteristic feature to large multimedia repositories that may then be used in a multiple ways to characterize the content in a very granular manner.

Once there is a uniform method of granular tagging of a content repository as described above, there are numerous applications of using the content tagged in the above fashion. Some of these applications are described below, and other related applications are readily apparent to one of skill in the art based on the ideas described herein.

In an exemplary embodiment of the present invention the granular emotional tagging of the multimedia content is used to identify the segment which is of concern to the users. The graph of emotional score with respect to time 404 on the reaction of content 406 being watched is used to identify the time segment of interest to the users. For instance, the different time segments of the content 306 are be analyzed to find out the scene of interest based on a query that asks to identify the segments of the video that have displayed the Emotion "Anger">0.4. This brings out the two identified segments as shown in region 412. These kinds of queries may be generalized over a whole set of videos comprising a content repository like Netflix, or YouTube videos.

In another embodiment of the present invention, the system of the present invention is used to identify specific segments of videos that have displayed the highest time averaged specific Emotion (say, "Happy"), or specific segments from a repository that have scored (averaged over all users) a score of "Surprised>0.6"

The method of the present invention may be used to create Movie Trailers for audience based on some initial feedback from a focus group. The system may be used to pick a given set of segments with the same video of content that have scored, say "Happy>0.5", averaged over all users, or all users in a specific age demography. The selected particular segment may be used to create a movie trailer.

We claim:

1. A system for tagging an online multimedia content or event in a time granular manner, the system comprising:

a network of a plurality of users with a plurality of client devices connected with each other;

a repository storing the online multimedia content or event and sharing the online multimedia content within the network of users;

a module inbuilt in each of the client devices configured to capture emotional expressions of the user reflecting emotional states, continuously along the length of the online multimedia event or content, while the user is interacting with the online multimedia;

a processor configured for generating an emotional score for each emotional state component in the time granular manner, continuously along the length of the online multimedia, by calculating the intensity of each emotional state component of the user at a given time stamp by determining the deviation of each generated emotional score from a baseline emotional score and normalizing the deviation;

the processor configured for calculating an average emotional score by calculating a mean of plurality of emotional scores reflected by a plurality of users in a time interval of the online multimedia content or event; and a second module for tagging the online multimedia content in the time granular manner by associating the emotional scores and the average emotional scores continuously along the length of online multimedia content or event.

2. The system of claim 1 wherein the client device can be a mobile phone, a Smartphone, a laptop, a camera with WiFi connectivity, a desktop, a tablet computer, or any other sensory device with connectivity.

3. The system of claim 1 wherein the emotional expressions of the users correspond to critical auditory, visual or any other sensory input or facial expressions of the users, such as Happy, Surprised, Fearful, Normal, Angry, Disgusted, Sad and the like.

4. The system of claim 1 wherein the emotional score corresponds to the emotion, response, attention span, gestures, hand and head movement or other reactions and stimuli of the user.

5. The system of claim 1 wherein the processor generates the emotional score as a function of time.

6. A method for tagging an online multimedia event or content in a time granular manner comprising:

distributing or sharing the online multimedia event or content, from a central multimedia repository, to one or more users with client devices, connected in a network;

capturing and processing emotional expressions reflecting emotional states of the user in the granular manner with respect to time length of the online multimedia content, by a module of the client device, while the user is interacting with the multimedia content;

providing a processor configured to generate an emotional score, corresponding to the intensity of each emotional state component in the time granular manner, continuously along the length of the multimedia content, by determining the deviation of each emotional state component from a baseline emotional state component and normalizing the deviation;

tagging the online multimedia content in the time granular manner by associating the emotional scores continuously along the length of multimedia content;

characterizing the online multimedia event or content based on the granular tagging of the emotional scores; and sharing the granular tagging characteristics of the online multimedia content in the one or more user's network.

7. The method of claim 6 wherein the online multimedia event or content includes video or audio content; or an online video conferencing.

8. The method of claim 6 wherein the client device can be a mobile phone, a Smartphone, a laptop, a camera with WiFi connectivity, a desktop, a tablet computer, or any other sensory device with connectivity.

9. The method of claim 6 wherein the emotional states of the users correspond to any critical auditory, visual or any other sensory input or facial expressions of the users, such as Happy, Surprised, Fearful, Normal, Angry, Disgusted, Sad and the like.

10. The method of claim 6 wherein the emotional scores designates emotions, response, attention span, gestures, hand and head movement, or other reactions or stimuli of the user.

11. The method of claim 6 wherein the emotional score is tagged to the online multimedia content as a function of time.

12. The method of claim 6 wherein the online multimedia event is tagged with average emotional scores of plurality of users in granular manner.

13. A method for granular tagging of an online multimedia event or content comprising:

capturing a user's instantaneous emotional state when interacting with the online multimedia event or content by a detection module for each frame of the online multimedia content;

providing a processor configured for generating an emotional score corresponding to each emotional state component as a function of time, by determining deviation of the emotional state component from a baseline emotional state component;

providing the processor configured for calculating an average emotional score by determining a mean of a plurality of emotional state components of a plurality of users at each frame of the online multimedia content;

tagging the multimedia content with the user's emotional score and the average emotional score of the plurality of users for the corresponding frame at the specific time stamp of the content;

characterizing the content in a granular manner using the user's emotional score and the average emotional score; and sharing the granular tagging characteristics of the content in the user's network.

14. The method of claim 13 wherein the online multimedia content are tagged granularly with respect to time.

15. The method of claim 13 wherein the emotional score corresponds to emotions, behavior, response, attention span, gestures, hand and head movement, or other reactions or stimuli of the user.

16. The method of claim 13 wherein the tagged multimedia content with average emotional scores are stored in a repository and are shared in the connected network and with other users.

17. The system of claim 1, wherein the client devices may transmit the captured emotional states of the users to one or more servers to process and generate emotional scores for the users.

* * * * *